July 9, 1946.  H. P. WAGNER  2,403,836
SELF-SEALING GASOLINE TANK
Filed June 10, 1941
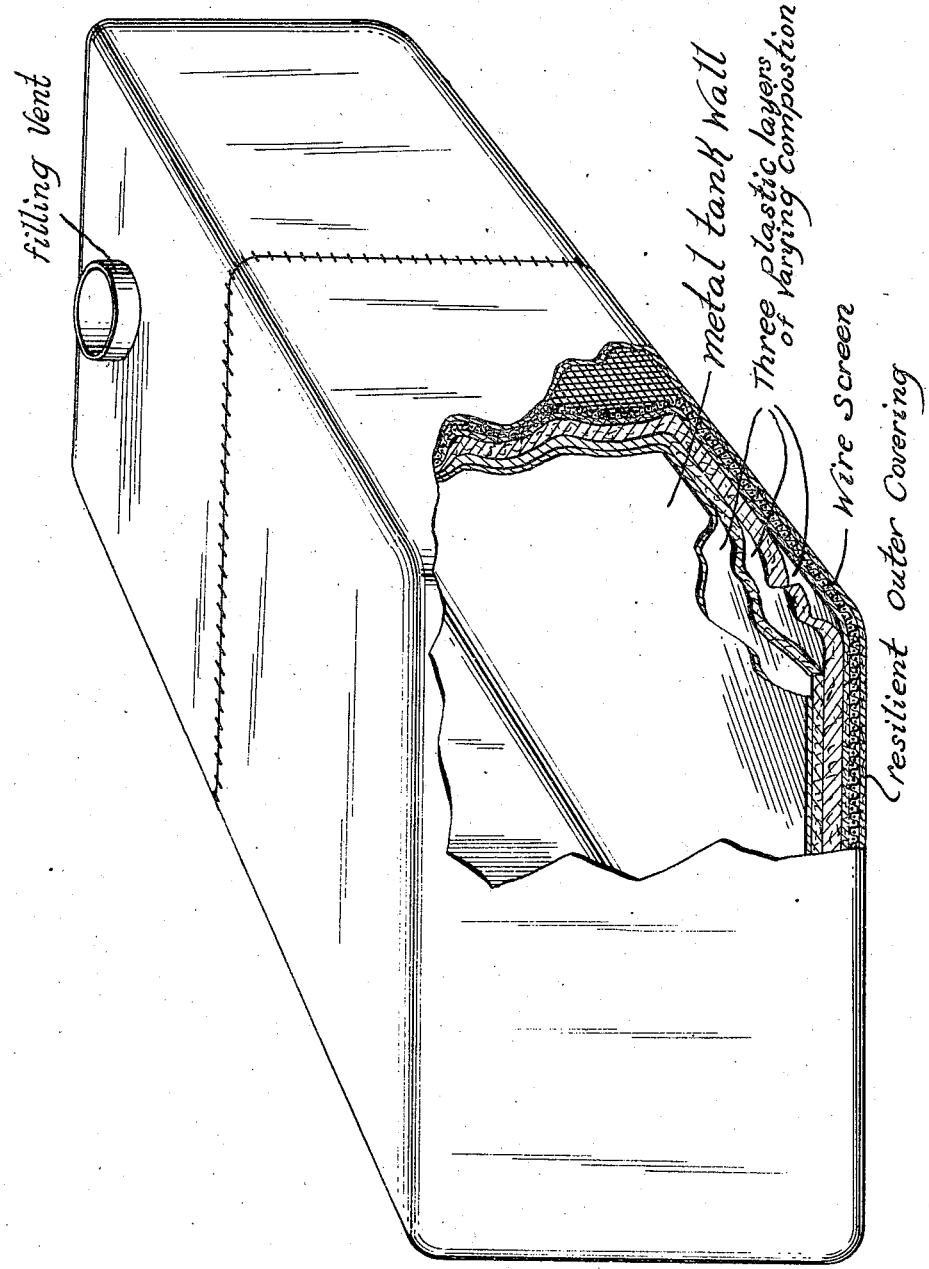
Inventor,
H. P. Wagner
Glascock Downing & Seebold
By: Attorneys.

Patented July 9, 1946

2,403,836

UNITED STATES PATENT OFFICE 2,403,836

SELF-SEALING GASOLINE TANK

Hans P. Wagner, Atlanta, Ga.

Application June 10, 1941, Serial No. 397,455

5 Claims. (Cl. 154—43.5)

This invention relates to self-sealing gasoline tanks; and it comprises a tank covered with at least one layer of plastic material comprising a water-soluble, synthetic resin insoluble in gasoline, a low-freezing vehicle and a long-fibered material dispersed therein in such proportions as to produce a composition remaining slightly plastic at temperatures as low as about 40° below zero Fahrenheit and having a softening or pour point at about a temperature of about 150° F.; said coating being advantageously in three layers, the outer two of which have substantially the properties stated while the intermediate layer has a composition comprising a water-soluble synthetic resin, an anti-freeze and a long-fibered material dispersed there in such proportions as to produce a composition with a solidifying point not above about −60° F. and a pour point not below about 100° F., said layers being advantageously enclosed by means of a wire screen and a leather or other flexible outer covering; all as more fully hereinafter set forth and as claimed.

The recently-developed leak-proof or self-sealing gasoline tanks employed in fighting aeroplanes and the like are usually constructed with two layers of artificial rubber and an intermediate layer of sponge rubber. Upon puncture of the tank, the sponge rubber is adapted to swell, owing to contact with the leaking gasoline, and this swelling in time produces stoppage of the leak. Under even the best of circumstances these tanks permit a considerable leakage of gasoline and consequently the specifications for leak-proof tanks have of necessity been drawn to permit such leakage.

It has now been found that self-sealing gasoline tanks can be constructed with plastic outer layers which, upon puncture, will quickly seal the leak and thereafter substantially prevent all leakage. The sealing function, in all but extremely unusual circumstances, is perfect. The advantages of this new construction, in comparison with the self-sealing gasoline tanks now in use, are tremendous.

In the new construction a fuel tank of synthetic rubber, metal or other material is covered with one or more of the self-sealing layers. It is advantageous to employ more than one self-sealing layer for the reason that in this case layers of somewhat different properties can be employed. For example, one layer especially adapted for low temperature operation and another, especially adapted to function at higher ambient temperatures, can be employed. If three layers are employed, the intermediate layer can be made somewhat more plastic than the outer layers in order that it may function satisfactorily even at the lowest temperatures, under which conditions the other layers might prove to be too viscous to produce the sealing action within the desired short time interval. Such an intermediate layer may prove somewhat too fluid to function satisfactorily at the highest summer temperatures, but the outer, more viscous layers are then in best condition to function satisfactorily.

If a single self-sealing layer is to be used, this must of necessity be made of intermediate properties and, while such a layer is completely satisfactory at moderate temperatures, it would be found not quite as satisfactory at either the highest or the lowest temperatures. The ideal self-sealing layer to employ would, of course, be one which would not change in viscosity from the highest summer temperatures to the lower temperatures encountered in winter. The materials required to produce such an ideal layer are obviously not available but materials approaching this ideal as closely as possible should be used.

It has been found that any of the water-soluble synthetic resins which are insoluble in gasoline are suitable for use in the self-sealing layers of this invention. These materials are also known as "Aqua Resins" and are highly viscous substances which are readily soluble in water and miscible with low molecular glycols, glycol ethers, etc. These materials are preferably mixed with a gasoline insoluble anti-freeze, such as ethylene glycol, diethylene glycol, "Essoline" glycol $(CH_3.CHOH.CH_2OH)$ methyl "Cellosolve" $(CH_2OH.CH_2OCH_3)$, butyl "Cellosolve" $(CH_2OH.CH_2OC_4H_9)$, etc., to form a low-freezing vehicle in which to suspend a long-fibered material, such as asbestos or cotton fibers. It is also advantageous to include a small amount of light-weight metallic powder as filler, such as magnesium or aluminum powders. The proportions of these ingredients used are such as to produce a plastic material which has a melting or pour point which is above the highest temperatures met in practice and also a freezing or solidifying point which is below the lowest temperatures encountered in practice. A specific example of a suitable "Aqua Resin" is "Glyborite," i. e. the boric acid ester of diethylene glycol.

The following specific examples represent compositions forming plastic layers which we have found suitable in actual practice:

Example 1

| | Per cent |
|---|---|
| "Glyborite" | 35 to 75 |
| Diethylene glycol | 25 to 45 |
| Asbestos fiber | 5 to 25 |
| Magnesium powder | 0 to 5 |

Example 2

| | Per cent |
|---|---|
| Asbestos fiber | 5 to 15 |
| "Essoline" glycol (propane-1,2-diol) | 30 to 50 |
| Aquaresin | 30 to 50 |
| Aluminum powder | 0 to 5 |

Example 3

| | Per cent |
|---|---|
| Starch | 10 to 30 |
| Asbestos fiber | 10 to 30 |
| "Aquaresin" | 10 to 25 |
| "Ethylene" glycol | 5 to 20 |
| Gum arabic | 0 to 5 |
| Water | 20 to 50 |

The composition represented by Example 1 has a congealing point of about −40° F. and a pour point of about 150° F.; that represented by Example 2 has a solidifying point of about −60° F. and a softening point of about 120° F., while the composition of Example 3 has a solidifying point of about 0° F. and a softening point of about 200° F. Within the temperature ranges indicated these layers are effective in producing self-sealing layers useful in the present invention although they are particularly effective at temperatures intermediate the indicated solidifying and softening temperatures.

In one embodiment of this invention the three layers represented by the above specific examples are used in combination, the composition of Example 1 being employed adjacent the fuel tank, the composition of Example 2 being used as an intermediate layer and the composition of Example 3 being used as an outer plastic layer. If a single layer is to be employed that represented by Example 1 will be found satisfactory, while if two layers are to be used, the compositions of Examples 1 and 2 in combination are suitable.

The above described plastic layers should be provided with some type of outer support and this may be accomplished by the use of an outer covering of resilient material, such as leather or artificial rubber, for example. It is also advisable to employ some type of stiffening material, such as a wire screening just beneath the resilient outer covering. The entire tank construction would then consist of the inner tank wall, the three plastic layers, in the order named, a wire screen and finally the outer resilient covering.

The method of applying the plastic layers of this invention to the fuel tank can be varied to suit particular conditions of manufacture. One method which has been found satisfactory is to first apply the inner plastic layer directly to the metal or rubber wall of the tank. The application of this layer can be assisted by heating the composition or the tank wall or both. The wire screen and the leather covering may be prepared in halves, the leather being sewed on the outside of the screen which is first formed properly to fit around the outside of the tank leaving a suitable space for the plastic layers. The outer plastic layer is then applied to the inside of the screen inside the leather cover, both halves being thus coated. The two halves may then be fitted around the coated tank and the leather halves may be sewed together to make a tight joint, leaving an intermediate space for the third plastic layer. This intermediate plastic layer may then be forced between the other two plastic layers by means of a so-called "gun" or force pump, this composition being heated if necessary before application. By this method the entire space between the inner and the outer plastic layers may be filled. And after the intermediate layer is introduced, the hole through which it was forced may be covered over or sewed together.

The thickness of the three layers, applied as described above, need not exceed one inch. The center layer may be made ½ inch in thickness and the other two of a thickness of ¼ inch, for example. A single layer of one-half inch affords considerable protection and, of course, for maximum protection, three or more layers may be applied having any suitable or allowable thickness.

The mode of operation of the self-sealing layers is believed to be self evident from the above description. When such layers are punctured, the plasticity of the above compositions is such that a slight flow ensues. The slight heat generated during the formation of the hole assists in this flow. The composition is heavier than the gasoline in the tank and hence the tendency is for the material to flow into the tank rather than for the gasoline to flow out. Only a slight flow of the plastic material is usually required to fill the hole and then the fibrous material in the composition prevents any tendency for "blowouts." The self-sealing layers described have been found capable of sealing over holes as large as 6 inches square, the leakage produced being negligible. This is believed to be a new result in the art.

In the accompanying drawing there is shown, more or less diagrammatically, a perspective view of a gasoline tank provided with the self-sealing layers of this invention. This showing is provided with descriptive legends which are believed self-explanatory. The corner of the tank is broken away to show the plastic layers. Three layers are shown, which may be of the compositions represented by the above specific examples. The compositions of Examples 1, 2 and 3 may form, respectively, the inner, the intermediate and the outer plastic layers.

In another specific example of the invention one or more plastic layers of different composition may be used. The composition of these layers may be as follows:

Example 4

50% to 80% of a 70% zinc chloride solution.
0.5% to 2% of glacial acetic acid.
18% to 48% of starch products.
0.25% to 0.50% or less of magnesium powder.

This composition will produce a leak-proof layer which will withstand temperatures between 200° above zero to 60° below zero Fahrenheit. If only a single layer is to be employed having the above composition, this layer should have a thickness of about one-half inch, whereas, if a layer of this composition is to be used in combination with any of the layers of Examples 1 to 3, its thickness should be approximately that of the other layers, the total thickness of the plastic layers amounting to from about ¾ to 1 inch. A single layer of the above composition, having a thickness of ½ inch will close large holes produced in a gasoline tank.

It will be noted that in the above composition the zinc chloride serves as an anti-freeze liquid.

The freezing point of this solution is about 60° F. below zero, and the solution remains unchanged up to a temperature of 200° F. or above.

The magnesium powder in the above composition is used as a swelling or gas expanding agent. It reacts with the acetic acid to produce hydrogen and the latter swells the mixture about 30 per cent or more. The foam is stable, since the composition as a whole is highly viscous. And the foam decreases the weight of the composition which is, of course, an important advantage when my tanks are used in aeroplanes.

Example 5

In making the composition of this example, from about 5 to 10 per cent of long-fibered asbestos is added to the composition of Example 4. The asbestos fibers should be saturated with zinc chloride before mixing with the other ingredients. This layer will also withstand temperatures from 200° F. above zero to 60° F. below zero.

The above two layers or one of them can be used either alone or in combination with any or all of the layers, the compositions for which are given in Examples 1 to 3 in order to produce leak-proof tanks. The layer containing the asbestos is advantageously placed next to the metal or rubber tank. In one embodiment the above asbestos-containing layer was placed adjacent the metal or rubber tank while the layer of Example 4 was used as the outer plastic layer, while a layer having a composition corresponding to Example 2 was used in between these two layers.

While several embodiments of this invention have already been disclosed, it is evident, of course, that modifications can be made in the specific compositions and structures described without departing from the purview of this invention. It is evident, for example, that tanks within the present invention can be constructed in any desired shape or size. It is usually preferred to construct these tanks in relatively flat shape, that is with a short vertical dimension, in order to reduce the head of gasoline and thereby to reduce the tendency of the gasoline to escape. It has already been mentioned that any of the "Aquaresins" which are insoluble in gasoline can be used in conjunction with a miscible, anti-freeze liquid which is also insoluble in gasoline to produce the desired vehicle of this invention. Any anti-freeze liquid is suitable which has the required solubility characteristics and which also has a solidifying point not substantially above 0° F., when mixed with from about 10 to 75 percent of "Aquaresin." The fibrous material to be used may be of any suitable type, such as asbestos, hemp, cotton and other vegetable and mineral fibers. These fibers must be inert to the materials with which they are contacted and should have a length ranging from about 1 to 2 inches for best results. In example 3 the gum arabic can be replaced by any other water-soluble gum, natural or artificial, and the starch can be replaced by any other amylaceous colloidal material having similar properties of increasing the viscosity of water. A preservative, such as Moldex (an ester of para-hydroxy benzoic acid) can be added to the composition of Example 3 or to the other compositions, if desired.

The zinc chloride solution used in the compositions of Examples 4 and 5 can be varied to some extent in strength without affecting the performance of my tank. Thus the concentration of zinc chloride may be reduced to about 50 per cent, if desired, in which case it is desirable to increase the percentage of starch in order to obtain a very viscous mixture. In place of starch, other carbohydrates which swell in water, producing viscous plastic compositions, can be employed, such as gum arabic, gum tragacanth and the like, or even wheat flour and the like can be employed. It is also possible to employ gas expanding agents aside from magnesium powder, such as the agents employed in making light weight concretes, for example. These agents are not essential ingredients of my composition but are highly advantageous.

The wire screen and outer layer of leather, which have been described above, may be replaced by a specially constructed layer consisting of a rather fine-mesh wire screen on both sides of which are placed layers of rubber, the rubber layers being vulcanized in situ, whereby they become bonded through the meshes of the screen. One of both sides of this assembly may be covered with a cloth layer, if desired. Other modifications which fall within the scope of the following claims will be immediately evident to those skilled in this art.

What is claimed is:

1. A self-sealing gasoline tank comprising a shell covered with at least one layer of plastic material having a composition comprising from about 50 to 80% of a zinc chloride solution having a concentration ranging from about 50 to 70% by weight, 0.5 to 2% of glacial acetic acid and 18 to 48% of an amylaceous material.

2. A self-sealing gasoline tank comprising a shell covered with at least one layer of plastic material having a composition comprising from about 50 to 80% of a concentrated zinc chloride solution, 0.5 to 2% of glacial acetic acid, 18 to 48% of starch and 5 to 10% of asbestos fiber.

3. A self-sealing gasoline tank comprising a shell covered with a layer of plastic material having a composition comprising from about 50 to 80% of a concentrated zinc chloride solution, 0.5 to 2% of acetic acid and 18 to 48% of a starch product, and a second layer of similar composition to which has been added from about 5 to 10% of asbestos fiber.

4. The self-sealing gasoline tank of claim 3 in combination with a third plastic layer comprising from about 10 to 75% of a water soluble synthetic resin insoluble in gasoline, about 10 to 50% of a non-flammable, anti-freeze liquid which is insoluble in gasoline and in which said resin is soluble and about 5 to 25% of a long-fibered inert material dispersed therein, the proportions of said ingredients being such that the composition has a solidifying point not substantially above 0° F. and a pour point not substantially below 100° F.

5. A self-sealing gasoline tank comprising a shell covered with a layer of plastic material having a composition comprising from about 50 to 80 per cent of a 70 per cent zinc chloride solution, from about 0.5 to 2 per cent of glacial acetic acid, from about 18 to 48 per cent of a colloidal starch and from about 0.25 to 0.50 per cent of magnesium powder.

HANS P. WAGNER.